United States Patent [19]

Shirane et al.

[11] Patent Number: 5,159,379
[45] Date of Patent: Oct. 27, 1992

[54] FLASH CONTROL METHOD AND APPARATUS FOR VARIABLE FOCAL LENGTH CAMERA

[75] Inventors: Hideto Shirane, Tokyo; Takao Umetsu, Saitama, both of Japan

[73] Assignee: Fuji Photo Film Co., Ltd., Kanagawa, Japan

[21] Appl. No.: 702,176

[22] Filed: May 20, 1991

[30] Foreign Application Priority Data

May 18, 1990 [JP] Japan .................................. 2-129877

[51] Int. Cl.⁵ ............................................ G03B 15/03
[52] U.S. Cl. .................................. 354/415; 354/132; 354/149.1
[58] Field of Search ...................... 354/415, 132, 149.1

[56] References Cited

U.S. PATENT DOCUMENTS

| | | | |
|---|---|---|---|
| 4,870,438 | 9/1989 | Taniguchi et al. | 354/132 |
| 5,023,639 | 6/1991 | Ushiro et al. | 354/132 |
| 5,051,763 | 9/1991 | Yukevich, Jr. | 354/132 |
| 5,109,845 | 5/1991 | Asakura et al. | 354/149.1 |

FOREIGN PATENT DOCUMENTS 2-50142 2/1990 Japan .

Primary Examiner—Russell E. Adams
Assistant Examiner—Jae N. Noh
Attorney, Agent, or Firm—Young & Thompson

[57] ABSTRACT

A variable focal length camera is provided with a built-in flash unit having a wide illuminating angle, and an external flash unit having a narrower illuminating angle can be externally attached to the camera. When the taking lens is set in a short focal length region, the external flash unit is used for pre-emission prior to an exposure so as to prevent the red-eye phenomenon, and a built-in flash unity is used for main-emission during the exposure. When the taking lens is set in a long focal length region, the built-in flash unit is used for the pre-emission and the external flash unit is used for the main-emission.

14 Claims, 5 Drawing Sheets

FLASH CONTROL METHOD AND APPARATUS FOR VARIABLE FOCAL LENGTH CAMERA

BACKGROUND OF THE INVENTION

The present invention relates to a flash control method and apparatus for a variable focal length camera, and more particularly relates to a flash control apparatus for driving two flash units according to the focal length of the camera.

Japanese Unexam. Patent Publ. No. 02-50142 discloses a flash control method for a camera, wherein either a built-in flash or an attached flash is driven to flash prior to an exposure, and the other is driven to flash during the exposure. In this way, the so-called "red-eye" phenomenon is prevented, because the pupils of the subject's eyes contract in response to the first emission preceding the actual exposure. (Hereinafter, such an emission preceding an actual exposure is referred to as a pre-emission, and the next emission during the exposure is referred to as a main-emission.)

A built-in flash unit of a camera ordinarily has a light distribution curve such that the illuminating angle of light therefrom is wide enough to cover the predetermined angle of view of the taking lens of the camera, whereas an external flash unit generally has a light distribution curve such that the illuminating angle of light therefrom is narrower than the light from the built-in flash unit in order to project light toward a more distant range than the built-in flash unit, even when the guide number of the external flash unit is equal to that of the built-in flash unit.

If the above-described known flashing method were applied to a variable focal length camera such as a zoom camera, having an ordinary built-in flash unit and an ordinary external flash unit, and the external flash unit were used for the pre-emission and thereafter the built-in flash unit were used for the main-emission, then the resulting photograph could be under-exposed when the taking lens is set in a long focal length region and the subject distance is relatively large, as is often the case in telephotography. This is because the angle of view of the taking lens set in the long focal length region is so narrow that the light from the built-in flash unit will spread beyond the angle of view and thus the density of light within the photographic field will be reduced.

On the other hand, if the built-in flash unit were used for the pre-emission and thereafter the external flash unit were used for the main-emission, then the peripheral area of the resulting photograph could be under-exposed when the taking lens is set in a short focal length region, because the angle of view in the short focal length region is wider than the illuminating angle of light from the external flash unit, and thus only the central area of the photographic field would be effectively illuminated by the external flash unit.

In order to effectively and uniformly illuminate the whole photographic field in whichever focal length region the taking lens is disposed, it would perhaps be possible to make the guide number of one of the flash units that is used for the main-emission large enough to illuminate a distant subject sufficiently, at the same time as making the illuminating angle of that flash unit wide enough to cover the wider angle of view in the short focal length region. But this approach would require increased capacity of the flash unit for main-emission, such that the volume of either the external flash unit or the built-in flash unit and therefore that of the camera body would be increased.

SUMMARY OF THE INVENTION

In view of the foregoing, a first object of the present invention is to provide a flash control apparatus and method for a variable focal length camera, whereby the photographic field can be properly illuminated and thus a proper exposure can be performed in whatever focal length region the taking lens is positioned.

Another object of the present invention is to control a built-in flash unit and an external flash unit of a variable focal length camera so as always to give a proper illumination while making the best use of the respective light distribution curves of these flash units, without increasing the volume of either of the flash units.

A further object of the present invention is to provide a variable focal length camera capable of preventing red-eye phenomenon as well as illuminating the subject in a proper manner irrespective of the focal length, again without increasing the volume of the camera.

Still another object of the present invention is to provide a flash control apparatus and method wherein it is possible alternatively to select one of two flash modes, one of which causes an increase in the amount of flash light and the other of which prevents the red-eye phenomenon discussed above.

To achieve the above and other objects according to the present invention, the external flash unit is used for pre-emission and the built-in flash unit is used for main-emission, when the taking lens is set in the short focal length region in which the illuminating angle of the external flash unit cannot cover the angle of view. When, on the other hand, the taking lens is set in the long focal length region in which the illuminating angle of the external flash unit can cover the angle of view, the built-in flash unit is used for pre-emission and the external flash unit is used for main-emission.

The pupils of the subject's eyes is contract in response to the pre-emission from either one of the built-in and external flash units, and thereafter the main emission from the other flash unit is performed in synchronism with an exposure, so that the red-eye phenomenon is prevented. Furthermore, when taking the picture of a subject in the short focal length region, the main-emission is performed by means of the built-in flash unit so as to cover the wider angle of view for the short focal length region, whereas when taking the picture of a subject in the long focal length region, the main-emission is performed by means of the external flash unit whose light distribution curve corresponds to the angle of view of the taking lens in the long focal region.

In this way, it is now possible to illuminate the photographic field effectively and properly in both focal length regions without enlarging the volume of either the external flash unit or the camera body.

According to a preferred embodiment of the present invention, it is possible to drive both flash units simultaneously so as to increase the amount of illuminating light, instead of driving the flash units alternately in the above-described manner.

BRIEF DESCRIPTION OF THE DRAWINGS

Other objects and advantages of the present invention will become apparent from the following description of preferred embodiments taken with reference to the accompanying drawings, in which.

DETAILED DESCRIPTION OF THE PREFERRED EMBODIMENTS

Figure 1:
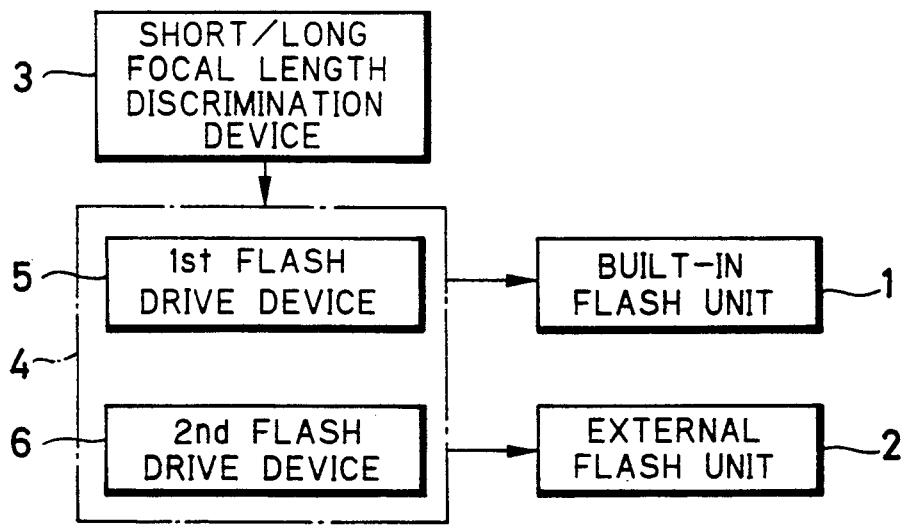
FIG. 1 is a block diagram explaining the method and apparatus of the present invention for preventing the red-eye phenomenon.

Referring to FIG. 1, there are provided a flash unit 1 built in a camera and a flash unit 2 externally attachable to the camera. The built-in flash unit 1 has a light distribution curve such that the light therefrom spreads enough to cover the angle of view of the taking lens when positioned in a short focal length region, such as a wide-angle lens position. The external flash unit 2 has a light distribution curve such that the illuminating angle thereof is narrower than that of the built-in flash unit 1 and thus reaches a more distant range than the light form the built-in flash unit 1 even if both flash units 1 and 2 are set at the same guide number.

A short/long focus discrimination device 3 determines whether the taking lens is positioned in the short focal length region such as a wide-angle position, or in the long focal length region such as a telephoto position. Specifically, the short/long focus discrimination device 3 compares the present focal length of the taking lens with a given focal length value which is predetermined based on the light distribution curve of the external flash unit 2. If the present focal length is less than the given focal length value, then it is determined that the taking lens is in the short focal length region, and if it is not less than the given value, then it is determined that the taking lens is in the long focal length region.

The short/long focus discrimination device 3 actuates a flash drive section 4 comprising a first flash drive device 5 and a second flash drive device 6 such that, when the lens position is in the short focal length region, the first flash drive device 5 drives the external flash unit 2 to emit light for pre-emission, and then the second flash drive device 6 drives the built-in flash unit 1 for main-emission. This is because, as described above, in the short focal length region having a wider angle of view, the light from the external flash unit 2 cannot cover the whole area of photographic field. On the other hand, when the lens position is in the long focal length region, the first flash drive device 5 drives the built-in flash unit 1 for pre-emission, and then the second flash drive device 6 drives the external flash unit 2 for main-emission.

In this way, when taking the picture of a subject in the short focal length region, the main-emission is performed by the built-in flash unit 1 so as to cover the wider angle of view for the short focal length region, and when taking the picture of a subject in the long focal length region, the main-emission is performed by the external flash unit 2 whose light distribution curve corresponds to the angle of view of the taking lens in the long focal length.

This is also preferable in view of the fact that the primary subject to be taken through the long focal length taking lens is often disposed in a distant range, so that the light from the built-in flash unit might not reach the subject.

The pupils of the subject's eyes contract in response to the pre-emission from either one of the built-in and external flash units, and thereafter the main-emission by the other flash unit is performed in synchronism with an exposure, so that the red-eye phenomenon is prevented.

Figure 2:
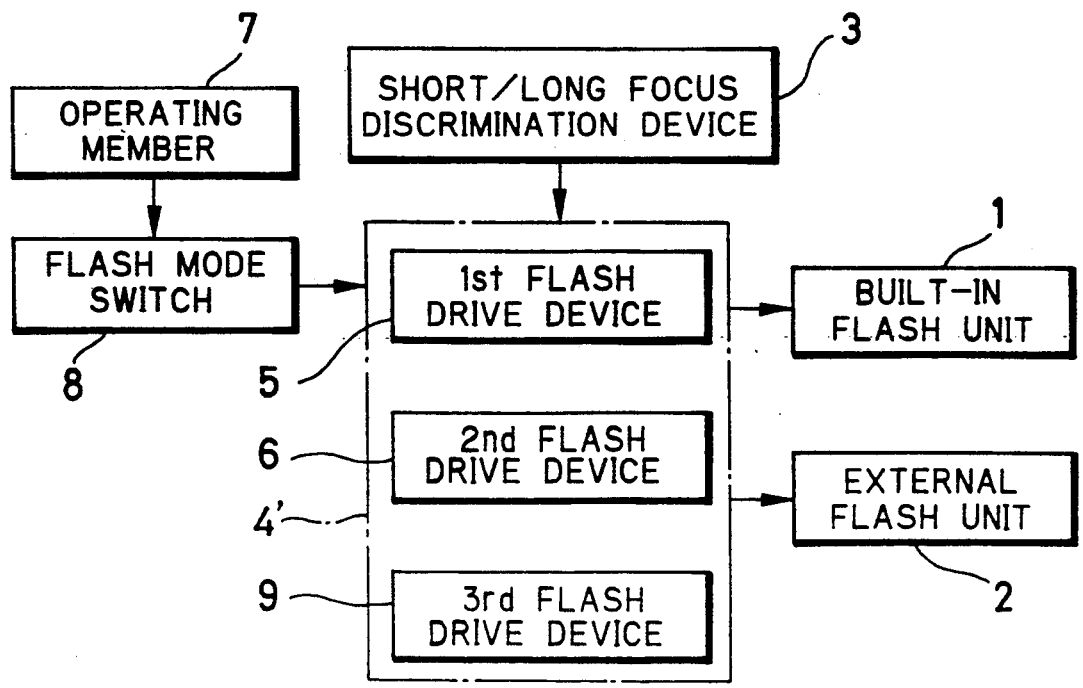
FIG. 2 is a block diagram explaining the method and apparatus of the present invention for increasing the amount of flash light.

Referring to FIG. 2, the flash control apparatus of the present invention may further comprise a manual operating member 7 disposed in the external flash unit 2 and a flash mode switch 8 which is disposed in the camera body and can be actuated by the operating member 7. The flash drive section 4' of this embodiment further comprises a third flash drive device 9 for driving both flash units 1 and 2 simultaneously so as to increase the flash light amount. When the flash mode switch 8 is actuated by the operating member 7, the third flash drive device drives both flash units 1 and 2 to flash during an exposure, while the driving of either the first or the second flash drive devices 5 and 6 is prevented.

In this way, it is now possible to select either one of two flash modes, one of which prevents the red-eye phenomenon and the other of which increases the amount of flash light, by means of the operating member 7.

Figure 3:
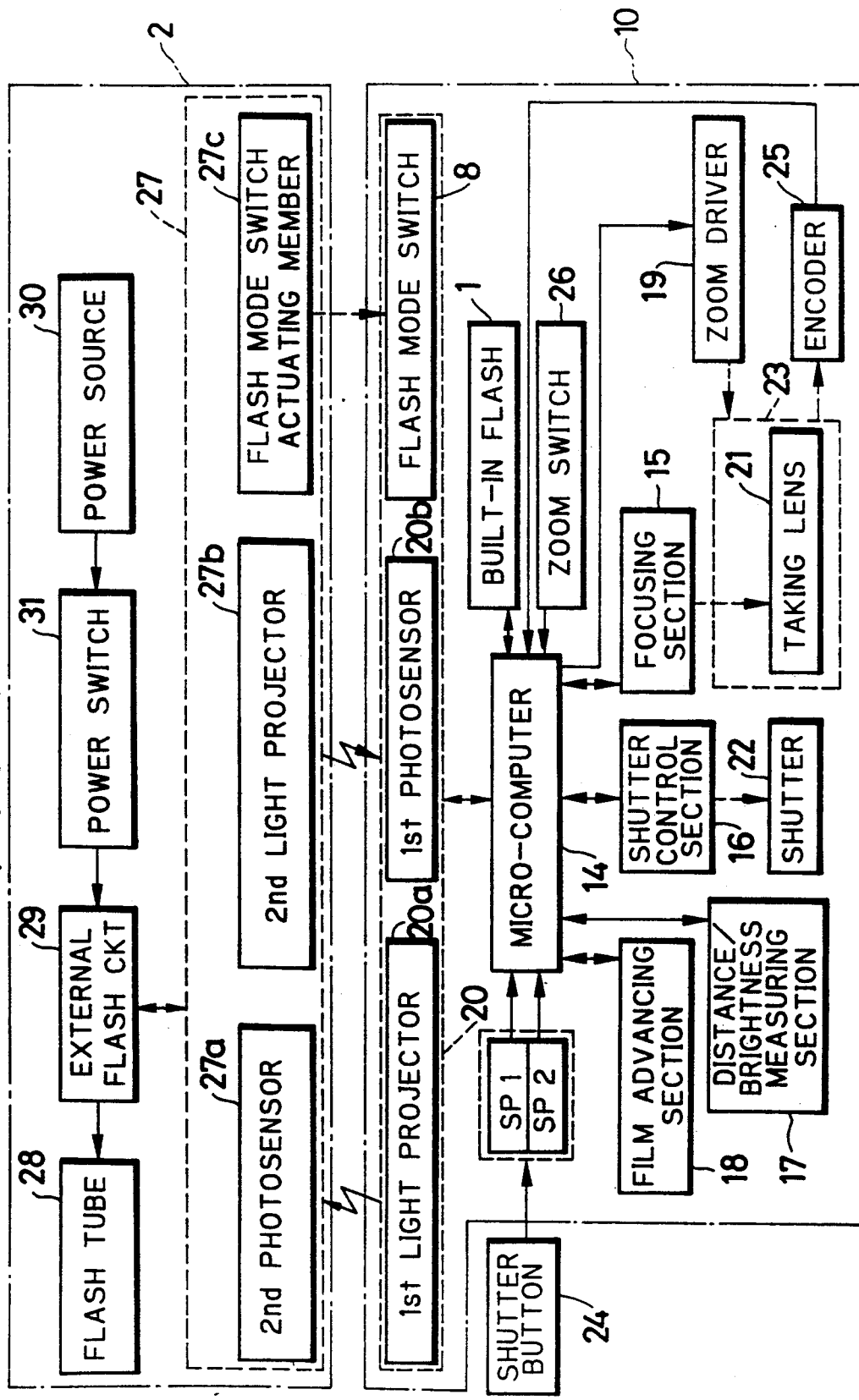
FIG. 3 is a block diagram showing the overall construction of a camera embodying the method and apparatus of the present invention.

FIG. 3 shows an embodiment of the present invention wherein the built-in flash unit 1 is disposed in a zoom camera 10 which can change its focal length (f-number) within a range from 35 mm to 115 mm. The external flash unit 2 is removably attached to the camera 10 by means of a screw or the like. The external flash unit 2 has a guide number larger than that of the built-in flash unit 1 so as to emit a relatively greater amount of light, and also has an illuminating angle that corresponds to the angle of view of the camera 10 when its focal length is set in a region not less than 70 mm. Therefore, the illuminating angle of the external flash unit 2 is narrower than that of the built-in flash unit 1, so that the external flash unit 2 can project light a greater distance than the built-in flash unit 1 even if these flash units 1 and 2 have the same guide number. The built-in flash unit 1 has a light distribution curve that covers the entire variation in the angle of view that occurs during zooming.

The camera 10 is provided with a microcomputer 14 which controls the built-in flash unit 1, a focusing section 15, a shutter control section 16, a distance/brightness measuring section 17, a film advancing section 18 and a zoom driver 19, as well as the external flash unit 2 coupled through an interface 20 of the camera 10. The built-in flash unit 1 starts charging upon receipt of a charge start signal from the microcomputer 14, and outputs a charge-up signal to the microcomputer 14 when it is sufficiently charged. Thereafter, upon receipt of a flash drive signal from the microcomputer 14, the built-in flash unit 1 flashes.

The focusing section 15 sets the taking lens 21 in a position dictated by an autofocus signal from the microcomputer 14, and returns the taking lens 21 to an initial position after exposure. The shutter control section 16 opens and closes the shutter 22 in response to a shutter open signal and a shutter close signal from the microcomputer 14, respectively. The distance/brightness measuring section 17 outputs data on the subject distance and the subject brightness to the microcomputer 14. The film advancing section 1B supplies the microcomputer 14 with data indicative of whether any unexposed frames remain, and advances the film in response to a film advancing signal from the microcomputer 14. The zoom driver 19 moves a lens barrel 23 holding the taking lens 21 in the direction of optical axis of the taking lens 21 according to a zoom control signal from the microcomputer 14. The camera interface 20 comprises a first light projector 20a, a first photosensor 20b and the flash mode switch 8 which will be described in more detail below.

When the shutter button 24 is half depressed, a first switch member SP1 of a release switch is switched on thereby to output a start signal to the microcomputer 14. A second switch member SP2 of the release switch is switched on by fully depressing the shutter button 24, thereby to output a release signal to the microcomputer 14. An encoder 25 supplies the microcomputer 14 with a code signal indicative of the present zooming position of the lens barrel 23, that is, the present focal length. A zoom switch 26 can be manually actuated to output a zoom drive signal to the microcomputer 14, which then drives the lens barrel 23 through the zoom driver 19 in accordance with the zoom drive signal.

The external flash unit 2 includes an interface 27, a flash tube 28, an external flash circuit 29 for driving the flash tube 28, a power source 30 and a power switch 31 disposed between the power source 30 and the external flash circuit 29. The interface 27 includes a second photosensor 27a, a second light projector 27b, and an actuating member 27c for the flash mode switch 8. When the external flash unit 2 is attached to the camera 10, the second photosensor 27a and the second light projector 27b are connected optically to the first light projector 20a and the first photosensor 20b, respectively, so that the first light projector 20a and the second photosensor 27a on the one hand, and the first photosensor 20b and the second light projector 27b on the other hand, form a photo-coupler.

The first light projector 20a optically sends an external flash drive signal to the second photosensor 27a in response to a command from the microcomputer 14. The second photosensor 27a transmits the external flash drive signal to the external flash circuit 29, which then drives the flash tube 28. The external flash circuit 29 also outputs a charge-up signal, indicating that the external flash unit 2 has been sufficiently charged, to the interface 27 of the external flash unit 2. The second light projector 27b optically sends the charge-up signal to the first photosensor 20b of the camera interface 20. The first photosensor 20b then transmits the charge-up signal to the microcomputer 14.

Attachment of the external flash unit 2 to the camera 10 also enables the flash mode switch actuating member 27c to actuate the flash mode switch 8. The flash mode switch 8 is otherwise switched off, and is switched on by the actuating member 27 upon attachment of flash unit 2, thereby outputting a corresponding on- or off-signal to the microcomputer 14.

Figure 4:
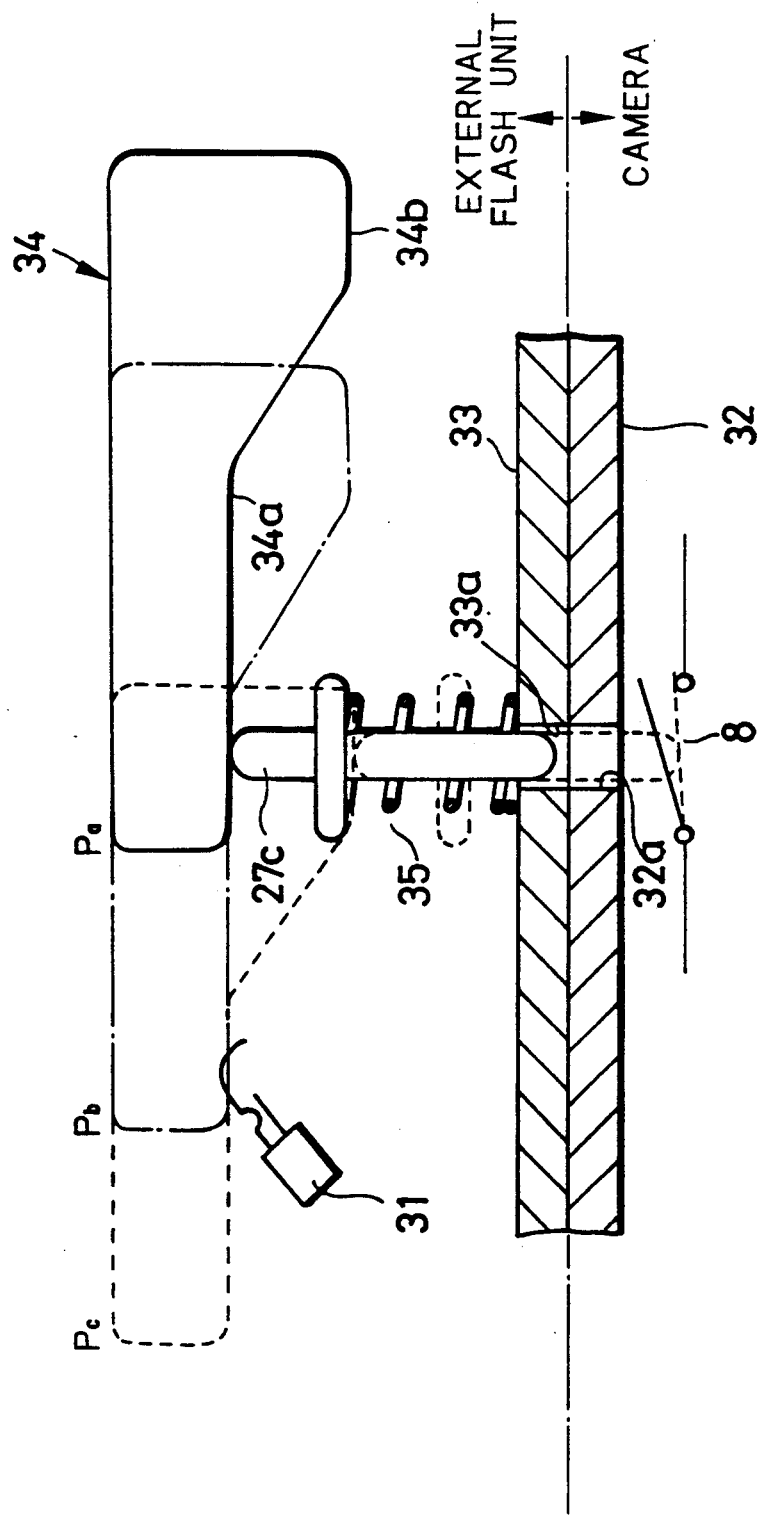
FIG. 4 schematically shows the relationship between the operating member and the flash mode switch.

An example of the flash mode switch actuating member 27c is shown in FIG. 4, wherein the actuating member 27c is operable by means of an operating member 34 which is used also to switch over the power switch 31. The actuating member 27c is a plunger-like member disposed inside a casing 33 of the external flash unit 2 and movable through a hole 33a formed in the casing 33 such that one end thereof, the bottom end in FIG. 4, can project outwardly. The hole 33a is located such that it is aligned with a hole 32a of the casing 32 of the camera 10. As seen in FIG. 4, the flash mode switch 8 is so disposed that the actuating member 27c projecting into the camera 10 through the holes 33a and 32a switches on the flash mode switch 8 (shown in dashed lines).

The actuating member 27c is urged upwardly by a spring 35 to bear at its other end, the top end in FIG. 4, against the bottom surface of the operating member 34. The bottom surface forms first and second cam surfaces 34a and 34b, the actuating member 27c being retracted inside the casing 33 when in contact with the first cam surface 34a (solid lines), and projecting out of the casing 33 when in contact with the second cam surface 34b (dashed lines).

The operating member 34 can be slidably changed over among three predetermined positions Pa, Pb and Pc. When the operating member 34 is set in the position Pa or Pb, the actuating member 27c is in contact with the first cam surface 34a, and thus stays inside the casing 33 of the external flash unit 2, so that the flash mode switch 8 is switched off. When the operating member 34 is set in the position Pc, the actuating member 27c is in contact with the second cam surface 34b, and thus projects into the camera 10 through the holes 33a and 32a, so that the flash mode switch 8 is switched on.

On the other hand, the power switch 31 is switched off when the operating member 34 is set in the position Pa, and is switched on when the operating member 34 is set in the position Pb or Pc. Accordingly, both the flash mode switch 8 and the power switch 31 are switched off in the position Pa, whereas the power switch is switched on (that is, electric power is supplied from the power source 30 to the external flash circuit 29 of FIG. 3), but the flash mode switch 8 is still switched off in the position Pb. In the position Pc, both switches 8 and 31 are switched on.

The overall operation of the above-described zoom camera will be described with reference to FIGS. 5A and 5B, in the case where the subject brightness is sufficiently low as to require supplementary illumination, and where the operating member 34 is set in the position Pc.

When the shutter button 24 is half depressed and thus the switch SP1 is switched on, the microcomputer 14 starts its brightness measurement procedure (steps 39 and 40) and determines based on subject brightness data detected by the distance/brightness measuring section 17 whether the subject should be photographed in a flash mode using flash light (step 41). Because supplementary illumination is necessary in this case, the sequence proceeds from the step 41 to a step 42 wherein it is determined with reference to the charge-up signal from the built-in flash unit 1 whether the built-in flash unit 1 has been sufficiently charged. When the answer is yes in step 42, then it is determined in the next step 43 whether the flash mode switch 8 is switched on. Because the flash mode switch 8 is switched on in this case, the sequence proceeds from step 43 to step 44 wherein it is determined with reference to the charge-up signal from the external flash unit 2 whether the external flash unit 2 has been sufficiently charged. If the answer is yes in the step 44, then the distance measurement procedure is started (step 45).

If, on the other hand, it is determined in step 42 that the built-in flash 1 is not completely charged, then the process proceeds from step 42 to step 46. If it is determined in step 46 that the first release switch SP1 is switched off, charging of the built-in flash unit 1 is started upon the microcomputer 14 outputting the charge start signal to the built-in flash unit 1 (step 47). This charging process is terminated when the microcomputer 14 receives the charge-up signal from the built-in flash unit 1. After step 47, the sequence returns to the first step 39.

If the external flash unit 2 is not completely charged in step 44, then the sequence also returns to the first step 39 by way of steps 46 and 47. It is to be noted that charging of the external flash unit 2 is automatically started independently of the camera 10 when the power switch 31 is turned on, and the charged condition is maintained until the external flash unit 2 is discharged. After discharging, the external flash unit 2 is automatically and repeatedly charged.

In the distance measurement process of step 45, an in-focus position of the taking lens 21 is determined based on subject distance data detected by the distance/brightness measuring section 17. In the next step 48, it is determined whether the second release switch SP2 is switched on. If the answer is "no" in the step 48, then it is determined whether the first release switch SP1 is switched off (step 49), and if the first switch SP1 is switched off at that time, then the sequence returns to step 47. If it is determined in step 49 that the first switch SP1 is switched on, then the step 48 is again executed until the second release switch SP2 is switched on. When the second release switch SP2 is switched on, the autofocus signal is output from the microcomputer 14 to the focusing section 15 so as to move the taking lens 21 into the in-focus position determined in step 45 (step 50).

Figure 5A:
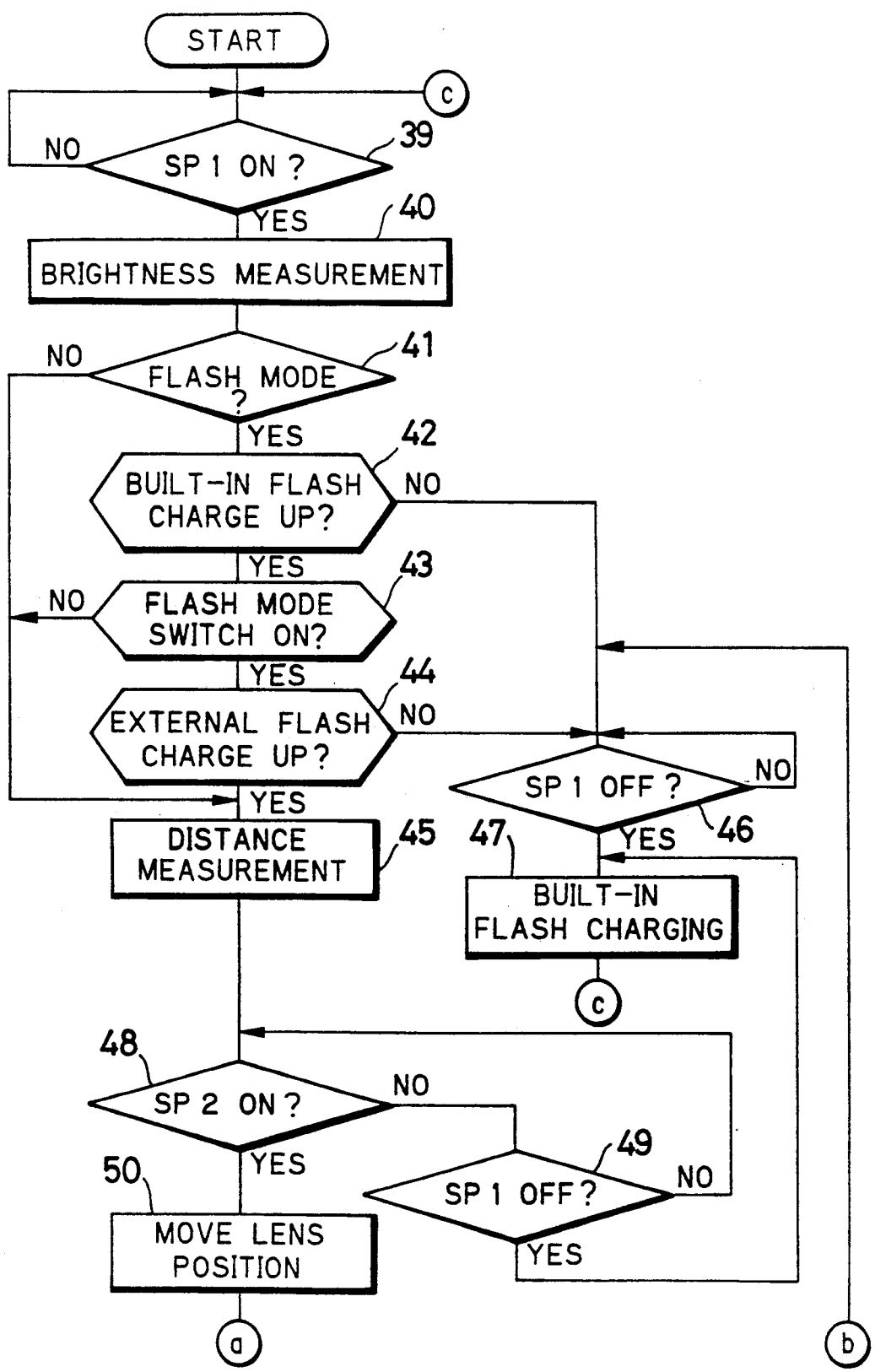
FIGS. 5A and 5B show a flow chart of a sequence for flash photography according to an embodiment of the invention.
Figure 5B:
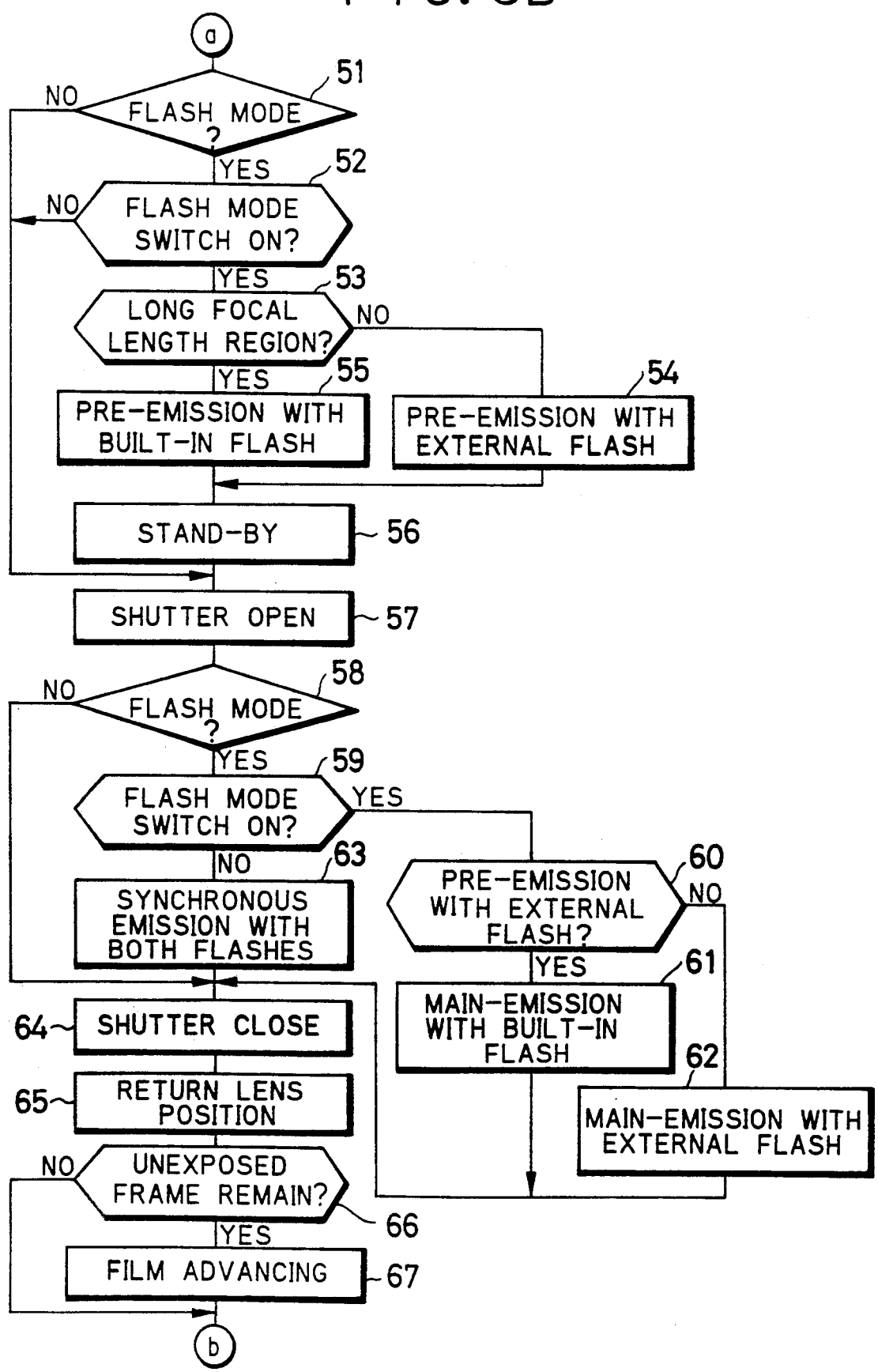

After step 50, it is determined whether supplementary illumination is necessary (step 51 of FIG. 5B). As the answer is "yes" for the purpose of this discussion, the camera 10 must be set in the flash mode wherein it is first determined whether the flash mode switch 8 is switched on (step 52). As the answer is "yes" in step 52, it is then determined, on the basis of a zoom code output from the encoder 25 indicative of the present zoom position or the present focal length, whether the camera 10 is set in the long focal length region in which the angle of view corresponds to the illuminating angle of the external flash unit 2 that is narrower than that of the built-in flash unit 1. Particularly, the present focal length of the taking lens is compared with a given focal length value, 70 mm for instance, which is predetermined based on the light distribution curve of the external flash unit 2. If the present focal length is less than the given focal length value, 35–70 mm in this embodiment, then it is determined that the taking lens is in the short focal length region, and if it is not less than the given value, 70–115 mm in this embodiment, then it is determined that the taking lens is in the long focal length region.

If it is determined that the present focal length belongs to the short focal length region, then pre-emission is performed using the external flash unit 2 (step 54). If, on the contrary, it is determined that the present focal length belongs to the long focal length region, then pre-emission is performed using the built-in flash unit 1 (step 55). Thereafter, the microcomputer 14 stands-by for a predetermined time (step 56), 0.5–1.5 second for instance, and then outputs the shutter open signal to the shutter control section 16 (step 57), thereby to start opening of the shutter 22.

In the next step 58, it is again determined that the camera is set in the flash mode. As noted above, the subject brightness is sufficiently low as to require supplementary illumination, so it is determined whether the flash mode switch 8 is switched on (step 59). Since the flash mode switch 8 is switched on, it is determined in the next step 60 whether the pre-emission has been performed using the external flash unit 2. If the pre-emission has been performed using the external flash unit 2, then the built-in flash unit 1 is driven to flash during the exposure time (step 61). If the pre-emission has been performed using the built-in flash unit 1, then the external flash unit 2 is driven to flash during the exposure time (step 62). It is to be noted that the main-emission with the external flash unit 2 is performed with a timing such that the exposure amount will be suitable.

After the main-emission process, the shutter close signal is given to the shutter control section 16 thereby to close the shutter 22 (step 64). Then, a lens return signal is given to the focusing section 5, so that the taking lens 21 is returned to the predetermined initial position (step 65). Thereafter, it is determined on the basis of a film existence signal from the film advancing section 18 whether any unexposed film frames remain (step 66). If there is an unexposed frame, a film advancing signal is given to the film advancing section 18 so as to advance the film by one frame (step 67). Thereafter, the sequence returns to step 46 of FIG. 5A. If all the frames have been exposed, then the sequence directly returns to step 46 from step 66.

As is apparent from the above description, if the subject brightness is so low as to need flash light illumination and, at the same time, the operating member 34 is set in the position Pc, that is, the power switch 31 is switched on to supply the external flash unit 2 and the flash mode switch 8 is also switched on, then a pre-emission prior to the actual exposure and a main-emission during the actual exposure are sequentially performed such that in the short focal length region at first then external flash unit 2 and then the built-in flash unit 1 are driven for the pre-emission and the main-emission, respectively, whereas in the long focal length region at first the built-in flash unit 1 and then the external flash unit 2 are driven for the pre-emission and the main-emission, respectively.

In this way, if the primary subject is a human, the red-eye phenomenon is prevented because the image of the pupils of the subject is stopped down in response to the pre-emission prior to the main-emission. Furthermore, the built-in flash unit 1 having a wider illuminating angle issued for the main-emission in the short focal length region, whereas the external flash unit 2 having a narrower illuminating angle is used for the main-emission in the long focal length region. Accordingly, it is possible to produce an effective and proper illumination no matter what the zoom position of the taking lens 21.

If the operating member 34 is set in the position Pb when flash light illumination is necessary, the operation of the camera 10 is as follows:

Because the power switch 31 is switched on but the flash mode switch 8 is switched off when the operating member 34 is set in the position Pb, step 44 in the flow chart of FIGS. 5A and 5B is omitted, and the sequence proceeds from step 43 directly to step 45. Furthermore, the sequence of FIG. 5B proceeds directly from step 52 to step 57 without executing steps 53, 54, 55 and 56, that is, the pre-emission is not performed. Thereafter, because the answer is "no" in step 59, the flash driven signals are applied to both of the built-in flash unit 1 and the external flash unit 2, thereby to cause these flash units 1 and 2 to flash simultaneously during exposure (step 63), so that the amount of illuminating light is increased.

If the operating member 34 is set in the position Pa when flash light illumination is necessary, the operation of the camera 10 is as follows:

Because the external flash unit 2 is not supplied with power, and the flash mode switch 8 is switched off when the operating member 34 is in the position Pa, the external flash unit 2 does not flash even though the flash drive signals are applied to both of the external and built-in flash units 2 and 1 in step 63. Accordingly, the pre-emission is not performed, and only the built-in flash unit 1 flashes during the main-emission.

If flash light illumination is unnecessary, then steps 42, 43 and 44 are not performed, and the distance measurement process is executed immediately after the brightness measurement process. Furthermore, steps 52-56 are not executed, and the sequence proceeds directly from the step 51 to the step 57. Thereafter, the sequence proceeds directly to step 64 without executing steps 59-63.

Although the above-described embodiments relate to the use of a zoom camera, the present invention may, of course, be applied to a dual focal length camera which can change over its focal length between a standard photography position and a telephoto position. In such a case, the standard photography position may be assigned to the short focal length region, whereas the telephoto position may be assigned to the long focal length region, so that the determination as to whether the taking lens is in a short focal length region or a long focal length region can be made. Needless to say, the standard photography position and the telephoto position are relative positions, and the present invention is thus also applicable to a dual focal length camera having a wide-angle position and a telephoto position, or a wide-angle position and a standard position, in the same way as above. Furthermore, the invention need not exclude a conventional mode of driving the external flash unit alone for main-emission without performing any pre-emission.

While the present invention has been described in detailed above with reference to preferred embodiments, thereof, it will be apparent to those skilled in the art that various changes and modifications of the present invention are possible without departing from the scope and spirit of the following claims.

What is claimed is:

1. A flash control method for a variable focal length camera having first and second flash units with different illuminating angles, said method comprising:
   a) detecting a present focal length of a taking lens of said camera;
   b) driving one of said first and second flash units to flash after actuation of an exposure control but prior to a shutter opening, selection of the first or second flash unit being made according to the detected present focal length; and
   c) driving the other of said first and second flash units so as to cause said other flash unit to flash during said shutter opening.

2. The flash control method as defined in claim 1, wherein said first flash unit is a built-in flash unit; and said second flash unit is an external flash unit attachable to said camera, and has a narrower illuminating angle than that of said built-in flash unit.

3. The flash control method as defined in claim 2, further comprising the step of determining whether the present focal length is in a first focal length region or in a longer second focal length region, and wherein said built-in flash unit is driven in step b) and said external flash unit is driven in step c) when the present focal length is in said longer second focal length region, whereas said external flash unit is driven in step b) and said built-in flash unit is driven in step c) when the present focal length is in said first focal length region.

4. The flash control method as defined in claim 3, wherein said determining step comprises the steps of comparing the present focal length with a focal length value that is predetermined based on the illuminating angle of said external flash unit.

5. The flash control method as defined in claim 3, further comprising the steps of:
   selecting a first or second flash mode by actuating an operating member, said first flash mode preventing red-eye phenomenon, and said second flash mode increasing the amount of flash light;
   executing step b) and step c) when said first flash mode is selected;
   inhibiting said step b) when said second flash mode is selected; and
   driving said first flash unit and said second flash unit simultaneously during said shutter opening in said second flash mode.

6. The flash control method as defined in claim 5, wherein a third flash mode is provided in which step b) is omitted and step c) is performed using either of said built-in flash unit or said external flash unit.

7. The flash control method as defined in claim 6, wherein only said built-in flash unit is used in said third flash mode.

8. A flash control apparatus for a variable focal length camera, comprising:
   a first flash unit built in said camera;
   a second flash unit externally attachable to said camera, said second flash unit having a narrower illuminating angle than that of said first flash unit;
   determining means for determining whether a present focal length of said camera is in a first focal length region or in a longer second focal length region, wherein said narrower illuminating angle of said second flash unit cannot cover an angle of view within said first focal length region;
   first flash drive means for driving said second flash unit prior to a shutter opening and driving said first flash unit during the shutter opening when the present focal length is in said first focal length region; and
   second flash drive means for driving said first flash unit prior to a shutter opening and driving sid second flash unit during the shutter opening when the present focal length is in said second focal length region.

9. The flash control apparatus as defined in claim 8, further comprising third flash drive means for simultaneously driving said first and second flash units during the shutter opening, and preventing these flash unit from being driven prior to the shutter opening.

10. The flash control apparatus as defined in claim 9, further comprising fourth flash drive means for driving only one of said first or second flash unit during the shutter opening, and preventing said flash units from being driven prior to the shutter opening.

11. The flash control apparatus as defined in claim 10, further comprising selecting means for selecting one of three flash modes: a first mode for activating said first or second flash drive means according to the present focal length, a second mode for activating said third flash drive means, and a third mode for activating said fourth flash drive means.

12. The flash control apparatus as defined in claim 11, wherein said selecting means includes an operating member disposed in said second flash unit, and a flash mode switching means disposed in said camera and switched over by said operating member so as to select one of said three flash modes when said second flash unit is attached to said camera.

13. The flash control apparatus as defined in claim 11, wherein said determining means performs determination by comparing the present focal length with a focal length value that is predetermined based on the illuminating angle of said second flash unit.

14. The flash control apparatus as defined in claim 11, wherein said variable focal length camera is changed over between a standard photography position and a telephoto position, and said determining means performs determination with reference to which of said positions is selected.

* * * * *